United States Patent Office 3,153,058
Patented Oct. 13, 1964

3,153,058
DIRECT OXIDATION OF OLEFINS IN A SOLVENT COMPRISING POLYACYL ESTERS OF POLYHYDROXY COMPOUNDS
Dexter B. Sharp and Robert C. Binning, Creve Coeur, Mo., assignors to Monsanto Company, St. Louis, Mo., a corporation of Delaware
No Drawing. Filed Feb. 18, 1963, Ser. No. 259,388
12 Claims. (Cl. 260—348.5)

The present invention relates to a process for the production of olefin oxides.

More particularly, this invention relates to a process for the direct oxidation of olefins in a liquid phase system.

Still more particularly, this invention relates to a process for the direct oxidation of olefins with molecular oxygen in a solvent comprising polyacyl esters of polyhydroxyalkanes, polyhydroxycycloalkanes, polyglycols, or mixtures thereof to produce olefin oxides.

Olefin oxides are commodities of substantial and growing commercial interest, utility and importance. For example, one or more of this class of compounds are useful as chemical intermediates, or in the preparation of solvents, lubricants, humectants, antifreezes, hydraulic fluids, fumigants, as components in foods and pharmaceuticals and in the preparation of polyester resins.

As a result of past, present and expanding utilities for olefin oxides, much research effort has been expended in an attempt to find a suitable method by which these compounds can be prepared on a commercial scale simply, safely, economically and dependably.

Typical of prior art methods for producing olefin oxides are the well-known chlorohydrin process and various vapor phase and liquid phase reactions. Inasmuch as the present invention is concerned with a novel liquid phase system, the discussion below will be directed to typical existing schemes for liquid phase olefin oxidations.

Among the reaction variables which must be considered in a liquid phase reaction are the nature of the solvent or diluent, the ratio of solvent to olefin and olefin to oxygen, oxygen concentration, residence time in the reactor, catalyst, temperature, pressure, competing side reactions, etc. Prior art processes describe various approaches to a proper balancing of the above variables in order to obtain the desired olefin oxide. For example, various specific oxidation catalysts, catalyst-solvent or catalyst-modifier-solvent system have been described (U.S. Patents 2,741,623, 2,837,424, 2,974,161, 2,985,668 and 3,071,601); another approach is the use of oxidation retarding anti-catalysts (U.S. 2,279,470); other approaches emphasize the use of various water immiscible hydrocarbon solvents containing polymerization inhibitors, such as nitrobenzene (2,780,635), or saturated hydrocarbons (2,780,634); or solvents containing acid neutralizers such as alkali and alkaline earth metal hydroxides and salts of these metals (2,838,524). Another approach involves the use of certain catalysts in an alkaline liquid phase (2,366,724), or a liquid phase maintained at specified critical pH values (2,650,927). Still other approaches center upon the criticality of the oxygen pressure (2,879,276), or the geometry of the reaction zone (2,530,509 and 2,977,374).

The foregoing approaches to the preparation of olefin oxides are representative of prior art processes and illustrate the problems encountered.

It is the primary object of the instant invention to provide a superior process for the commercial production of olefin oxides.

An object of this invention is to provide a process which is free of numerous limitations recited in prior art processes.

An object of this invention is to provide a liquid phase process for the production of olefin oxides, which process is not dependent upon the presence or absence of any catalyst or surface-active catalyst system; is not dependent upon water-immiscible solvents or solvents containing added buffers, acid neutralizers, saturated compounds, initiators or inhibitors; is not dependent upon critical reactor geometries, temperatures, pressures, pH level, oxygen concentration, flow rates or reactant ratios.

Another object of this invention is to provide a process for the production of olefin oxides in either a batch or continuous manner.

Still another object is to provide a process for the production of olefin oxides which is simple, safe, economical and dependable.

These and other objects of the invention will become apparent to those skilled in the art as the description of the invention proceeds.

According to the present invention, it has been discovered that olefins can be oxidized to epoxides with molecular oxygen in high conversions and yields when the oxidation takes place in a liquid reaction medium comprising fully esterified polyacyl esters of polyhydroxyalkanes, polyhydroxycycloalkanes, polyglycols or mixtures thereof. Polyacyl esters contemplated herein contain, generally, from 1 to 18 carbon atoms in each acyl moiety and from 2 to 18 carbon atoms in each alkylene or cycloalkylene moiety. However, best results obtain when the acyl moiety contains from 1 to 6 carbon atoms and the alkylene and cycloalkylene moiety each contains from 2 to 6 carbon atoms. These esters may be readily prepared by methods known to the art. For example, in U.S. patent 1,534,752 is described a method whereby glycols are reacted with carboxylic acids to produce the corresponding glycol ester. Acid anhydrides and acid chlorides may be used in place of the acids.

Representative glycols include straight chain glycols, such as ethylene glycol, propylene glycol, butylene glycol, pentylene glycol, hexylene glycol, heptylene gycol, octylene glycol, nonylene glycol, decylene glycol, dodecylene glycol, pentadecylene glycol and octadecylene glycol. Branched chain glycols such as the iso-, primary, secondary and tertiary isomers of the above straight chain glycols are likewise suitable, e.g., isobutylene glycol, primary, secondary, and tertiary pentylene glycols, 2-methyl-2,4-pentanediol, 2-ethyl-1,3-hexanediol, 2,3-dimethyl-2,3-butanediol, 2-methyl-2,3-butanediol and 2,3-dimethyl-2,3-dodecanediol. Polyalkylene glycols (polyols) include diethylene glycol, dipropylene glycol, tripropylene glycol, tetrapropylene glycol and dihexylene glycol.

In addition to straight and branched chain glycols, alicyclic glycols such as 1,2-cyclopentanediol, 1,2-cyclohexanediol, 1-methyl-1,2-cyclohexanediol and the like may be used.

Other suitable hydroxy compounds include polyhydroxyalkanes, such as glycerol, erythritol and pentaerythritol and the like.

Representative carboxylic acids include fatty acids such as formic acid, acetic acid, propionic acid, butyric acid, valeric acid, caproic acid, caprylic acid, lauric acid, palmitic acid, stearic acid, naphthenic acids, such as cyclopentanecarboxylic acid, cyclohexanecarboxylic acid, and aromatic acids such as benzoic acid and the like.

Representative polyacyl esters include polyacyl esters of polyhydroxyalkanes, such as triacyl esters of glycerol, e.g., glycerol triacetate; tetraacyl esters of erythritol and pentaerythritol, e.g., erythritol tetraacetate and pentaerythritol tetraacetate and the like, and polyacyl esters of polyalkylene glycols (polyglycols), such as diethylene glycol diacetate, dipropylene glycol diacetate, tetraethylene glycol diacetate and the like. These polyacyl ester solvents may be used individually or as mixtures, being compatible with each other. For example, a mixture of varying proportions of a diacyl ester of a dihydroxyalkane, such as propylene glycol diacetate, and a polyacyl ester of a polyglycol, such as dipropylene glycol diacetate, may be used. Or, a mixture of a polyacyl ester of a polyglycol, such as dibutylene glycol dibutyrate, and a polyacyl ester of a polyhydroxyalkane, such as glycerol trivalerate, or pentaerythritol tetrapropionate may be used as the solvent in the instant process illustrated in the examples below.

Of particular interest in the present invention are the vicinal diacyl esters of alkylene glycols, such as the diformates, diacetates, dipropionates, dibutyrates, divalerates, dicaproates, dicaprylates, dilaurates, dipalmitates and distearates, and mixtures thereof, of the alkylene and polyalkylene glycols recited above. Still more particularly, of greater interest are the diacetates of ethylene and propylene glycols used individually or in admixtures of any proportion.

Polyacyl esters having mixed acyl groups are likewise suitable, e.g., ethylene glycol formate butyrate, propylene glycol acetate propionate, butylene glycol acetate caproate, diethylene glycol acetate butyrate, dipropylene glycol propionate caproate, tetraethylene glycol butyrate caprylate, erythritol diacetate dipropionate, pentaerythritol dibutyrate divalerate, glycerol dipropionate butyrate and cyclohexanediol acetate valerate.

Monoacyl esters of polyhydroxyalkanes, polyhydroxycycloalkanes and polyglycols are unsuitable for use as a reaction medium according to the present invention. The same is true of other hydroxy or hydroxylated compounds such as glycerin, glycols, polyglycols and hydroxy carboxylic acids. This is due to the presence of an abundance of reactive hydroxyl groups which are susceptible to auto-oxidative attack, hence, introduce a concomitant oxidation side reaction which competes with the desired direct epoxidation of the olefin, and too, these hydroxyl groups when esterified with organic acids present, produce water which together with water normally formed in the oxidation provide quantities sufficient to inhibit the oxidation of the olefin to the olefin oxide and/or to hydrolyze the olefin oxide present.

The solvents as used in the instant novel process combine all the essentials recognized in the art for ideal solution phase olefin oxidations, e.g., they are high boiling (i.e., with respect to the primary oxidation products these solvents have a higher boiling point), essentially chemically indifferent, oxidatively and thermally stable. However, the instant solvents are superior to those disclosed in prior art olefin oxidation processes in that the latter require buffers, neutralizers, initiators, inhibitors, modifiers and/or surface active catalysts etc., to utilize or augment the above-mentioned essentials of the solvent, to promote oxidation of the olefin, combat the deleterious effects of by-products, e.g., acids, or to retard excessive oxidation, whereas the solvents of the present invention do not require these additives. In prior art processes the solvents are used primarily to facilitate contact of the reactants, or as a diluent to disperse the reaction products, to provide a medium for suspension of catalysts or to moderate the oxidation temperatures and reactions involved.

It is known that of the myriad by-products formed in olefin oxidations, deleterious constituents such as water, formic acid and acetic acid are formed which, when present in appreciable quantities, can react with the olefin oxide to give the corresponding glycol and glycol derivatives and/or enhance the formation of undesired polymeric materials. To counteract these deleterious constituents, prior art methods have used waterimmiscible hydrocarbon solvents containing basic substances or inhibitors (see above references), or solutions of salts of acids weaker than formic acid in a separate acid extraction procedure operating on the oxidation mixture drawn from the oxidation step. (2,741,623.)

It is a feature of the present novel process that the polyacyl ester solvents used herein obviate the need for any added substances to counteract the deleterious effect of water and acids. In fact, the polyacyl esters used herein are not water immiscible, hence, avoid the problems of the two-phase reaction products posed by water immiscibility. Moreover, by use of these esters a substantial quantity of both water, up to 10% by weight, and organic acids (common by-products in olefin oxidations), e.g., acetic acid in ethylene and propylene oxidations, up to 20% by weight, can be tolerated. Moreover, a surprising quantity of formic acid also may be present without impairing the obtention of the olefin oxide yield.

The precise mechanism by which the polyacyl esters described herein function is as yet not known. However, without being limited to or restricted by the same, it is postulated that proton solvation reduces acid activity to a level permitting substantially complete retention of the olefin oxide formed in the oxidation. This proton solvation results in an "acid-leveling" effect the degree of which is craracteristic of the polyacyl ester solvent.

In essence, the overall acid activity due to acids, such as acetic and formic acid products formed, e.g., in the oxidation of propylene to propylene oxide, is primarily a function of the activity of the conjugate acid represented by the interaction of formic and acetic acids with the solvent, as depicted in the following equation:

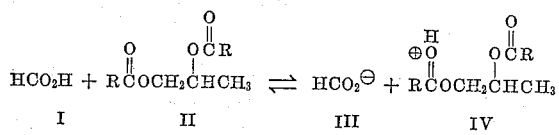

Formula III, the formate anion, is the conjugate base of formic acid (I), and Formula IV, protonated glycol diacylate, is the conjugate acid of the glycol ester (II). The protonated glycol diacylate can exist as a number of equilibrated isomeric forms representing different attachments of the proton to the diester, exemplified in the following set of equilibria involving structures of Type IV:

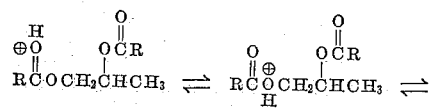

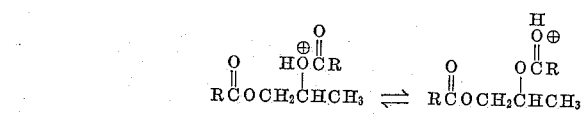

It is apparent that this multiplicity of equilibrium isomers will markedly reduce the acid activity of the original acid in pure state, or dissolved in a solvent which contains few or none of the moieties capable of attracting and complexing the proton, such as hydrocarbon solvents and the like. The above equations should be considered as exemplary with respect to definitive structure, and are representative of acid leveling effects contemplated as operative for a wide variety of solutions of the instant polyacylates and carboxylic acids. The superior solvent properties of the instant polyacyl esters for this direct epoxidation process is believed to be due in part to the effect of this proton solvation.

While prior art processes disclose the addition of basic substances or neutralizers to reduce the acidity of the reaction mixture to, generally, pH 7 or higher, see e.g., U.S. 2,780,634 and 2,650,927 (pH 7–10.5 in the latter), it is an additional benefit of the instant process that no basic substances need be added to the diacyl ester solvents and that olefin oxidations occur at pH's as low as pH 4 as well as in neutral and alkaline solutions.

A further advantage of the instant invention is that the polyacyl esters are generated in situ by esterification of formed glycols with formed acids and by reaction of by-product acetic acid and propylene oxide. The economic advantage is that less solvent is needed to replace that depleted in continuous operation. The technical advantage is that the acids used in the esterification are not then available to inhibit the oxidation of the olefin to the olefin oxide.

There is substantial evidence that olefin oxidations, e.g., propylene to propylene oxide, are propagated by a free-radical chain mechanism. For example, copper and its compounds are strong inhibitors of propylene oxidation. This is probably due to a facile Cu-peroxy radical redox reaction which interrupts the chain propagation and prevents attainment of the long kinetic chain length required for reasonable conversion. Also, when free-radical inhibitors, such as antioxidants, are added marked repression or total inhibition of the olefin oxidation occurs.

The polyacyl esters used herein are very stable to free-radical attack, probably because of a preponderance of primary hydrogens and, possibly, a steric screening and electronic stabilization of hydrogens attached to the carbons bearing the oxygen atoms of the hydroxy compound.

On the other hand many prior art solvents, per se, are subject to free radical attack and form compounds which inhibit the oxidation. For example, benzene (a not uncommon olefin oxidation solvent when containing various catalysts, inhibitors, neutralizers, initiators, etc.) when used by itself is attacked by free radicals, a well-known phenomenon. Then oxygen reacts with the benzene to give phenolic or quinonoid-type molecules which are efficient inhibitors for radical chain oxidation. Thus, in comparison, while benzene as solvent is unstable in the presence of free radicals and is auto-inhibitory, the polyacyl ester solvents of the present invention are stable and have a high order of resistance to radical attack.

The polyacyl esters used herein constitute a suitable reaction medium for substantially all olefin oxidations with molecular oxygen to form olefin oxides. The term "molecular oxygen" as used herein includes pure or impure oxygen, or those gases containing free oxygen, e.g., air.

Olefins suitable for use herein preferably include those of the ethylenic and cycloethylenic series up to 18 carbon atoms per molecule, e.g., ethylene, propylene, butenes, pentenes, hexenes, heptenes, octenes, nonenes, dodecenes, pentadecenes, heptadecenes, octadecenes, cyclobutene, cyclopentene, cyclohexene, cyclooctene, etc. Of particular interest, utility and convenience are the olefins containing from 2 to 8 carbon atoms. Included are the alkyl-substituted olefins such as 2-methyl-1-butene, 2-methyl-2-butene, 4-methyl-2-pentene, 2-ethyl-3-methyl-1-butene, 2,3-dimethyl-2-butene and 2-methyl-2-pentene. Other suitable olefinic compounds include isobutylene, conjugated and unconjugated dienes including the butadienes, e.g. 1,3-butadiene, isoprene, other pentadienes, hexadienes, heptadienes, octadienes, decadienes, dodecadienes, octadecadienes; cyclopentenes, cyclohexenes; aryl-substituted cycloalkenes and cycloalkadienes such as 1-phenyl-1-cyclohexene, 3-(1-naphthyl)-1-cyclopentene, 1-(1-biphenyl)-1,3-cyclohexadiene; vinyl-substituted cycloalkenes, such as 4-vinyl-1-cyclohexene, 4-vinyl-1,4-dimethyl-1-cyclohexene; vinyl-substituted benzenes, such as 4-methylstyrene, 4-phenylstyrene, 1,4-divinylbenzene, cyclopentadiene; dicyclopentadiene; alkyl-substituted cycloalkenes and cycloalkadienes; styrene, α-methylstyrene, methylstyrenes; unsaturated macromolecules, such as homopolymers of butadiene and isoprene and copolymers thereof, e.g., polybutadiene, natural rubber, butadiene/ styrene copolymers, butyl rubber, butadiene-acrylonitrile copolymers, and the like.

The olefin feed stocks contemplated herein include the pure olefin, mixtures thereof or olefin stocks containing as much as 50% or more of saturated compounds. Olefinic feed materials include those formed by cracking hydrocarbon oils, paraffin wax or other petroleum fractions such as lubricating oil stocks, gas oils, kerosenes, naphthas and the like.

The reaction temperatures and pressures are those generally employed in liquid phase olefin oxidations and are subject only to those limits outside which substantial decomposition, polymerization and excessive side reactions occur in liquid phase oxidations. Generally, temperatures of the order of 50° C. to 400° C. are contemplated. Temperature levels sufficiently high to prevent substantial build-up of any hazardous peroxides which form are important from considerations of safe operation. Preferred temperatures are within the range of from 150° C. to 250° C. Suitable pressures herein are within the range of from 0.2 to 350 atmospheres, i.e., subatmospheric, atmospheric or superatmospheric. However, the oxidation reaction is facilitated by use of higher temperatures and pressures, hence, the preferred pressure range is from 5 to 200 atmospheres. Pressures and temperatures selected will, of course, depend upon the individual olefin oxidation desired, but will be such as to maintain a liquid phase.

Olefin oxidations in the instant polyacyl ester solvents are auto-catalytic, proceeding very rapidly after a brief induction period and give controllable product composition over wide variations in conditions. A typical olefinic oxidation, e.g., propylene in a batch run, requires from about 1 to 20 minutes. Similar, or faster, reaction rates obtain in continuous operation.

The reaction vessel may consist of a wide variety of materials. For example, almost any kind of ceramic material, porcelain, glass, silica, various stainless steels, Monel metal, aluminum, silver and nickel are suitable. It should be noted that in the instant invention where no added catalysts are necessary, no reliance is made upon the walls of the reactor to furnish catalytic activity. Hence, no regard is given to reactor geometry to furnish large-surface catalytic activity.

Intimate contact of the reactants, olefin and molecular oxygen, in the solvent is obtained by various means known to the art, e.g., by stirring, shaking, vibration or other vigorous agitation of the reaction mixture.

As noted above, no added catalysts are required in the present invention. However, due to the versatility of the polyacyl esters in olefin oxidations, the usual oxidation catalysts can be tolerated although usually no significant benefit accrues from their use. For example, metalliferous catalysts such as platinum, selenium, vanadium, cobalt, nickel, cerium, chromium, iron, manganese, silver, cadmium, mercury and their compounds, preferably in the oxide form, etc., may be present in gross form, supported or unsupported, or as finely-divided suspensions.

In like manner, since the olefin oxidations according to this invention proceed at a rapid rate after a brief induction period, no initiators or promoters are required, but may be used to shorten or eliminate the brief induction period, after which no additional initiator or promoter need be added.

Suitable initiators include organic peroxides, such as benzoyl peroxide; inorganic peroxides, such as hydrogen and sodium peroxides; peracids, such as peracetic and perbenzoic acids; ketones, such as acetone; ethers, such as diethyl ether; and aldehydes, such as acetaldehyde, propionaldehyde and isobutyraldehyde.

In carrying out the process of the instant invention, the reaction mixture may be made up in a variety of ways. For example, the olefin and/or oxygen may be pre-mixed with the solvent (suitably, up to 50% by weight and, preferably, from 5 to 30% by weight of the solvent). Preferably, the olefin is pre-mixed with the solvent and the oxygen-containing gas introduced into the olefin-solvent mixture incrementally, or continuously, or the olefin and oxygen-gas may be introduced simultaneously through separate or common feed lines into a body of the pure polyacyl ester solvent in a suitable reaction vessel (described above). In one embodiment an olefin and oxygen-containing gas mixture is introduced into the pure solvent in a continuously stirred tank reactor, under the conditions of temperature and pressure described earlier. Suitable olefin: oxygen volumetric ratios are within the range of 1:5 to 15:1. Feed rates, generally, may vary from 0.5 to 1500 ft.$^3$/hr., or higher, and will largely depend upon reactor size. The oxygen input is adjusted in such manner as to prevent an excess of oxygen ($>$1%) in the off-gas. Otherwise, a hazardous concentration of explosive gases is present, as is well-known in the art. Also, if the oxygen (or air) feed rate is too high the olefin will be stripped from the mixture, thus reducing the concentration of olefin in the liquid phase and reducing the rate of oxidation of the olefin, hence giving lower conversions per unit time.

In the preferred mode of operation the polyacyl esters used herein constitute the major proportion of the liquid reaction medium with respect to all other constituents including reactants, oxidation products and co-products dissolved therein. By major is meant that enough solvent is always present to exceed the combined weight of all other constituents. However, it is within the purview of this invention, although a less preferred embodiment, to operate in such manner that the combined weight of all components in the liquid phase other than polyacyl esters exceeds that of the polyacyl ester solvent. For example, a refinery grade hydrocarbon feedstock or a crude hydrocarbon feedstock containing, e.g., 50% by weight of the olefin to be oxidized, e.g., propylene, and 50% by weight of saturated hydrocarbons, e.g., an alkane such as propane, may be used in quantities up to 50% by weight based on the solvent. Upon oxidizing this feedstock, unreacted olefin, alkane and oxygen together with oxidation products including the olefin oxide, intermediates such as acetone and methyl acetate, and high boilers (components having boiling points higher than that of the polyacyl ester solvent) formed in the reaction and/or recycled to the reactor may constitute as much as 75% by weight of the liquid reaction medium, according to reaction conditions or recycle conditions.

When carrying out the invention according to the less preferred mode of operation, the quantity of polyacyl ester solvent present in the liquid reaction medium should be not less than 25% by weight of said medium in order to advantageously utilize the aforementioned benefits characteristic to these unique olefin oxidation solvents.

In further embodiments of the present invention for oxidizing olefins with molecular oxygen in the liquid phase, the polyacyl ester solvents are suitably used in combination with diluents or auxiliary solvents which are relatively chemically indifferent, oxidatively and thermally stable under reaction conditions. Here, too, the polyacyl ester solvents should be utilized in quantities not less than 25% by weight of the liquid reaction medium in order to retain the superior benefits of these polyacyl ester solvents in liquid phase olefin oxidations.

Suitable diluents which may be utilized with the polyacyl ester solvents of this invention include, e.g., hydrocarbon solvents such as benzene, cyclohexane, toluene, xylenes, kerosene, biphenyl and the like; halogenated benzenes such as chlorobenzenes, e.g., chlorobenzene and the like; dicarboxylic acid esters such as dialkyl phthalates, oxalates, malonates, succinates, adipates, sebacates, e.g., dibutyl phthalate, dimethyl succinate, dimethyl adipate, dimethyl sebacate, dimethyl oxalate, dimethyl malonate and the like; aromatic ethers such as diaryl ethers, e.g., diphenyl ether; halogenated aryl ethers such as 4,4'-dichlorodiphenyl ether and the like; dialkyl and diaryl sulfoxides, e.g., dimethyl sulfoxide and diphenyl sulfoxide; dialkyl and diaryl sulfones, e.g., dimethyl sulfone and dixylyl sulfone; chloroform, carbon tetrachloride and nitroalkanes, e.g., nitromethane. While the foregoing have been cited as typical diluents which may be used in combination with the polyacyl ester solvents of this invention, it is to be understood that these are not the only diluents which can be used. In fact, the benefits accruing from the use of these polyacyl esters can be utilized advantageously when substantially any relatively chemically indifferent diluent is combined therewith.

Therefore, the present invention in its broadest use comprehends the oxidation medium consisting essentially of at least 25% by weight based on said medium of at least one fully esterified polyacyl ester described above.

In any case, the liquid reaction medium referred to herein is defined as that portion of the total reactor content which is in the liquid phase.

The oxidation products are removed from the reactor as a combined liquid and gaseous effluent containing the olefin oxide and unreacted components, by properly adjusting the conditions of temperature and pressure, or the reaction mixture containing the oxidation products is removed from the the reactor and the olefin oxide separated. Conventional techniques for the separation of olefin oxides from olefin oxidation products include distillation, fractionation, extraction, crystallization and the like. One procedure comprises continually removing the liquid effluent from the reaction zone to a distillation column and removing the lower boiling components, including olefin oxide, overhead; separating the olefin oxide from this overhead fraction, and removing the bottoms from the initial distillation, comprising essentially the diacyl ester of glycol solvent and recycling to the reaction zone.

The following examples illustrate specific embodiments of the present invention:

A modified cylindrical Hoke high-pressure vessel was employed for the batch-type oxidations described below. A high pressure fitting was welded to the vessel near one end to serve as gas inlet, and a block valve with rupture disc was attached to this fitting with a ¼" high-pressure tubing "goose-neck." A thermocouple was sealed into one end-opening of the vessel. The solvent and additives (if any) are then charged through the other end-opening which is then sealed with a plug. The olefin is then charged under pressure to the desired amount, as determined by weight difference, and the charged vessel affixed to a bracket attached to a motor-driven eccentric which provides vibrational agitation. The vibrating reaction vessel can be immersed in a hot bath for heating to reaction temperatures and quenched in a cold bath.

*Example I*

To a Hoke pressure vessel of 150-ml. capacity was charged 25.7 g. of propylene glycol diacetate, approximately 0.13 g. of acetaldehyde and 6.29 g. of propylene. The sealed vessel was mounted on an agitator assembly and immersed in a polyethylene glycol bath maintained at 200° C. When thermal equilibrium was reached, oxygen was admitted to the vessel at 400 p.s.i.g. pressure, then after 2 minutes from the start an additional 100 p.s.i.g. oxygen was added; total over-pressure with respect to autogenous pressure developed at 200° C. in the vessel was 300 p.s.i.g. A maximum temperature of 230° C. was reached during oxidation which started immediately upon introduction of the oxygen. The oxidation was allowed to proceed for a total of five minutes, then the oxygen was shut off, and the vessel was immersed in a cold water bath.

Analyses of gaseous and liquid phases showed a propylene conversion of 20% and a mole percent propylene oxide yield of 44.6%; the latter calculated against the quantity of propylene consumed. Mole percent yields of other products are tabulated below:

| Compound: | Mole percent yield |
|---|---|
| Acetaldehyde | 4.2 |
| Methanol | 10.2 |
| Methyl acetate | 1.8 |
| Acetone | 2.2 |
| Formic acid | 0.4 |
| Acetic acid | 16.5 |
| Water | 12.6 |

*Example II*

To a Hoke pressure vessel is charged 22.50 g. of ethylene glycol diacetate, 0.17 g. of acetaldehyde, and 7.0 g. of 2,3-dimethyl-2-butene. The sealed vessel is attached to an agitator assembly and immersed in a bath maintained at 120° C., and when thermal equilibrium is reached, oxygen is introduced to give a total pressure of 150 p.s.i.g. Oxidation begins immediately and is allowed to proceed for five minutes, at which time the oxygen is shut off and the vessel is immersed in a cold water bath. Analyses indicate 60% conversion of 2,3-dimethyl-2-butene to oxygenated products, among which 2,3-dimethyl-2,3-epoxybutane is obtained in 65% yield.

*Example III*

To a Hoke pressure vessel is charged 24.10 g. of hexylene glycol diacetate, 0.17 g. of acetaldehyde, and 7.0 g. of 2-methyl-2-butene. The sealed vessel is attached to an agitator assembly and immersed in a polyethylene glycol bath maintained at 150° C. When thermal equilibrium is reached, oxygen is introduced to a total pressure of 300 p.s.i.g., whereupon oxidation commences immediately. The oxidation is allowed to proceed for five minutes, then the oxygen is shut off and the vessel is immersed in a cold water bath. Analyses indicate a 53% conversion of 2-methyl-2-butene to oxygenated products, among which 2-methyl-2,3-epoxybutane is obtained in 49% yield.

*Example IV*

To a Hoke pressure vessel is charged 25.20 g. of propylene glycol dicaproate, 0.17 g. of acetaldehyde, and 10.0 g. of a branched dodecene of the type known to the art as propylene tetramer or tetrapropylene. The sealed vessel is attached to an agitator assembly and immersed in a polyethylene glycol bath maintained at 160° C. Oxygen is introduced to a total pressure of 300 p.s.i.g., whereupon oxidation commences immediately. The oxidation is allowed to proceed for ten minutes, then the oxygen is shut off and the vessel is immersed in a cold water bath. Analyses indicate 63% conversion of the branched dodecene to oxygenated products, among which epoxydodecane is obtained in 40% yield.

*Example V*

To a Hoke pressure vessel is charged 23.0 g. of cyclohexanediol diacetate, 0.17 g. of acetaldehyde and 6.0 g. cyclohexene. The sealed vessel is attached to an agitator assembly and immersed in a polyethylene glycol bath maintained at about 200° C. When thermal equilibrium is reached, oxygen is introduced to a total pressure of about 300 p.s.i.g. Oxidation is allowed to proceed for ten minutes, then the oxygen is shut off and the vessel is immersed in a cold water bath. Analyses indicate a 45% conversion of cyclohexene to oxygenated products, among which cyclohexene oxide is obtained in 30% yield.

*Example VI*

To a Hoke pressure vessel is charged 24.0 g. of propylene glycol di-cyclohexanecarboxylate, 0.16 g. of acetaldehyde and 7.0 g. of propylene. The sealed vessel is attached to an agitator assembly and immersed in a polyethylene glycol bath maintained at about 200° C. When thermal equilibrium is reached, oxygen is introduced to a total pressure of about 300 p.s.i.g. Oxygenation is allowed to proceed for 10 minutes, then the oxygen is shut off and the vessel is immersed in a cold water bath. Analyses indicate a 30% conversion of propylene to oxygenated products, among which propylene oxide is obtained in 35% yield.

*Example VII*

To a Hoke pressure vessel is charged 25.0 g. of propylene glycol dibenzoate, 0.17 g. of acetaldehyde and 7.2 g. of propylene. The sealed vessel is attached to an agitator assembly and immersed in a polyethylene glycol bath maintained at about 200° C. When thermal equilibrium is reached, oxygen is introduced to a total pressure of about 300 p.s.i.g. Oxygenation is allowed to proceed for 10 minutes, and the oxygen is shut off and the vessel is immersed in a cold water bath. Analyses indicate a 29% conversion of propylene to oxygenated products, among which propylene oxide is obtained in 38% yield.

*Example VIII*

To a modified Hoke pressure vessel is charged propylene glycol acetate butyrate as solvent, acetaldehyde as initiator, and butadiene. The sealed vessel is attached to an agitator assembly and immersed in a polyethylene glycol bath maintained at about 150° C. When thermal equilibrium is reached, oxygen is introduced to a total pressure of about 200 p.s.i.g., and the oxidation is allowed to proceed for five minutes. The oxygen is shut off and the vessel is immersed in a cold water bath. Analyses indicate a 45% conversion of butadiene to oxygenated products, among which butadiene dioxide is obtained in a small yield and butadiene monoxide is obtained in 25% yield.

*Example IX*

To a Hoke pressure vessel is charged propylene glycol diacetate solvent, acetaldehyde initiator, and vinylcyclohexene. The sealed vessel is attached to an agitator assembly and immersed in a polyethylene glycol bath maintained at about 200° C. When thermal equilibrium is reached oxygen is introduced to a total pressure of about 300 p.s.i.g. and the oxidation is allowed to proceed for fifteen minutes. The oxygen is shut off and the vessel is imersed in a cold water bath. Analyses indicate 25% yield of vinylcyclohexene oxide; a 50% conversion of vinylcyclohexene to oxygenated products occurs.

*Example X*

To a Hoke pressure vessel is charged ethylene glycol diacetate solvent, acetaldehyde initiator and styrene. The sealed vessel is attached to an agitator assembly and immersed in a polyethylene glycol bath maintained at about 180° C. When thermal equilibrium is reached, oxygen is introduced to a total pressure of about 200 p.s.i.g. and the oxidation is allowed to proceed for ten minutes. The oxygen is shut off and the vessel is immersed in a cold water bath. Analyses indicate a 65% conversion of styrene to oxygenated products, among which styrene oxide is obtained in 28% yield.

*Example XI*

To a Hoke pressure vessel is charged a mixture of equal proportions of ethylene glycol diacetate and propylene glycol diacetate as solvent, 0.18 g. of acetaldehyde and ethylene. The sealed vessel is attached to an agitator assembly and immersed in a polyethylene glycol bath maintained at about 200° C. When thermal equilibrium is reached, oxygen is introduced to an overpressure of 200 p.s.i.g. and the oxidation allowed to proceed for 15 minutes. The oxygen is shut off and the vessel immersed in a cold water bath. Analyses indicate 14% conversion of ethylene to oxygenated products, among which ethylene oxide is obtained in 20% yield.

*Example XII*

In the same apparatus described in the preceding examples, the following run was made: Ethylene glycol diacetate, 23.8 g., containing 10 drops of acetaldehyde was charged to the vessel and the vessel was sealed. Ethylene, 7.31 g., was charged under pressure, the vessel was attached to the agitator and connected to the oxygen feed. The vessel was immersed in the 200° bath and allowed to equilibrate, and, when hot, showed an autogenous pressure of 660 p.s.i.g. An overpressure of oxygen was preset, and oxygen was introduced during the first minute of reaction until 1017 p.s.i.g. was reached. After the oxidation had proceeded for 9.5 minutes, the oxygen feed valve was closed and the vessel was immersed in the cold water bath about 10 minutes. With valve closed, the vessel-block valve assembly was removed and gas and liquid contents analyzed by vapor phase chromatographic methods. A recovery of 6.09 g. of ethylene was obtained, signifying 16.6% conversion of ethylene. Analysis of the liquid showed 0.367 g. of ethylene oxide to be present and the ethylene oxide present in the gas phase was about 0.1 g. signifying a 24.3% yield. Also obtained was a 1 mole percent yield of methyl formate, 7 mole percent yield of methanol, and a 54.5 mole percent yield of water and a 50 mole percent yield or $CO_2$, all based on ethylene reacted.

*Example XIII*

In the same apparatus described in the preceding examples, the following run is made: diethylene glycol diacetate, 23.8 g., containing 10 drops of acetaldehyde is charged to the vessel and the vessel sealed. Ethylene, 7.31 g., is charged under pressure, the vessel attached to the agitator and connected to the oxygen feed. The vessel is immersed in the 200° bath and allowed to equilibrate, and, when hot, develops an autogenous pressure of 660 p.s.i.g. An overpressure of oxygen is preset, and oxygen is introduced during the first minute of reaction until 1020 p.s.i.g. is reached. After the oxidation has proceeded for 10 minutes, the oxygen feed valve is closed and the vessel immersed in the cold water bath about 10 minutes. With valve closed, the vessel-block valve assembly is removed and gas and liquid contents analyzed by vapor phase chromatographic methods. A recovery of 6.1 g. of ethylene is obtained, signifying 16.6% conversion of ethylene. Analyses of the gas and liquid indicate 0.37 g. of ethylene oxide to be present, signifying a 19.0% yield, based on ethylene conversion.

Mixtures of polyacyl esters of polyglycols are equally suitable in the process as described in this example.

*Example XIV*

In the same apparatus described in the preceding examples, the following run is made: Glycerol triacetate 24.0 g., containing 10 drops of acetaldehyde is charged to the vessel and the vessel sealed. Propylene, 7.10 g., is charged under pressure, the vessel attached to the agitator and connected to the oxygen feed. The vessel is immersed in the 200° bath and allowed to equilibrate, and, when hot, develops an autogenous pressure of 320 p.s.i.g. An overpressure of oxygen is preset, and oxygen introduced during the first minute of reaction until 620 p.s.i.g. is reached. After the oxidation has proceeded for 10.0 minutes, the oxygen feed valve is closed and the vessel immersed in the cold water bath about 10 minutes. With valve closed, the vessel-block valve assembly is removed and gas and liquid contents analyzed by vapor phase chromatographic methods. A recovery of 4.85 g. of propylene is obtained, signifying 31.6% conversion of propylene. Analyses of gas and liquid indicate 1.31 g. of propylene oxide to be present, signifying a 40.0% yield, based on propylene conversion.

Mixtures of polyacyl esters of polyhydroxy alkanes are equally suitable in the process as described in this example.

*Example XV*

In the same apparatus described in the preceding examples, the following run is made: pentaerythritol tetraacetate, 24.3 g., containing 10 drops of acetaldehyde is charged to the vessel and the vessel sealed. 2-methyl-2-butene, 8.5 g., is charged under pressure, the vessel attached to the agitator and connected to the oxygen feed. The vessel is then immersed in the 200° bath and allowed to equilibrate, and, when hot, develops an autogenous pressure of 200 p.s.i.g. An overpressure of oxygen is preset, and oxygen introduced during the first minute of reaction until 500 p.s.i.g. is reached. After the oxidation has proceeded for 11.0 minutes, the oxygen feed valve is closed and the vessel immersed in the cold water bath about 10 minutes. With valve closed, the vessel-block valve assembly is removed and gas and liquid contents analyzed by vapor phase chromatographic methods. A recovery of 5.0 g. of 2-methyl-2-butene is obtained, signifying 41.2% conversion of 2-methyl-2-butene. Analyses of the gas and liquid indicate 2.58 g. of 2-methyl-2,3-epoxybutane to be present, signifying an 60.0% yield. Also obtained is a 20 mole percent yield of acetone, a 28.0 mole percent yield of water and a 26 mole percent yield of $CO_2$, all based on 2-methyl-2-butene converted.

Similarly, comparable results are obtained when mixtures of polyacyl esters of polyhydroxy alkanes are utilized as solvent in the process, e.g., equal proportions of erythritol tetraacetate and pentaerythritol tetraacetate.

*Example XVI*

This example exemplifies a continuous operation of olefin oxidation according to the present invention. A 1.0 liter stirred stainless steel autocalve was employed as the reactor portion of a continuous unit. Three feedlines with necessary controls to meter reactants into the reactor were used to introduce propylene, oxygen and propylene glycol diacetate solvent into a bottom inlet in the reactor. A product over-flow pipe drained gaseous and liquid product during operation into a separation system from which gas and liquid samples were withdrawn for analyses.

Using propylene glycol diacetate as solvent, the reactor was heated to 200° C. and propylene was charged to about 15% by weight of the solvent. Several incremental additions of oxygen were added to start the reaction, then the three reactants were pumped into the system. Reactor pressure was 51.9 atmospheres. In a typical run the reactants were added at the following hourly rates: propylene, 532 g., oxygen, 269 g., solvent 4631 g. At steady state, (reactor residence time was 4.4 minutes) propylene conversion was 54%, oxygen conversion was 99.9% and propylene oxide yield was 46%. A 22 mole percent yield of acetic acid was also obtained, along with minor yields of a number of other products. Of the propylene glycol diacetate solvent used 100% was recovered, thus demonstrating the oxidative and thermal stability of this solvent and its effectiveness as an olefin oxidation reaction medium.

*Example XVII*

The same procedure as described in Example XVI is followed except that ethylene glycol diacetate as solvent is used instead of propylene glycol diacetate and ethylene is substituted for propylene. Hourly feed rates are: glycol ester solvent, 4500 g., ethylene, 525 g., and oxygen, 260 g. At steady state (reactor residence time 4.8 minutes) under 80 atm. pressure and 220° C., ethylene conversion is 47%, oxygen conversion, 99.9% and ethylene oxide yield, 40%. The mole percent yields of other products are similar to those obtained in the preceding example. Also, the ethylene glycol diacetate solvent is recovered 100%.

*Example XVIII*

In a continuous operation similar to that described in the preceding example, propylene glycol diacetate solvent, 1,3-butadiene and oxygen are fed to a reactor heated to 150° C. and pressured to 50 atmospheres. At steady state, reactor residence time of about 4.5 minutes butadiene conversion is 45%, oxygen conversion, 99.9% and butadiene oxide yield, 28 mole percent.

Example XIX

The same procedure described in the preceding example is repeated in the continuous production of styrene oxide.

Using propylene glycol diacetate as solvent, the reactor is heated to 180° C. under 50 atmospheres pressure, and styrene is fed to the reactor to about 15% by weight of the solvent. Oxygen is then added slowly and continuously to start the reaction and the three components fed into the system. At steady state, reactor residence time about 4 minutes, styrene conversion is 65%, oxygen conversion, 99.9% and styrene oxide yield, 29 mole percent.

Example XX

In a continuous operation similar to that described above, dipropylene glycol diacetate solvent, 1-phenyl-1-cyclohexene and oxygen are fed to the reactor. The reactor is heated to 200° C. and pressured to 51 atmospheres. At steady state, reactor residence time of about 4.5 minutes, 1-phenyl-1-cyclohexene conversion is 42%, oxygen conversion 98% and 1-phenyl-1-cyclohexene oxide is obtained in 30 mole percent, yield.

Example XXI

In a procedure similar to that described in the preceding examples, 1-methyl-1,2-cyclohexanediol diacetate as solvent is fed, together with 4-vinyl-1-cyclohexene and oxygen, to a reactor heated to 200° C. and pressured to 50 atmospheres. At steady state 4-vinyl-1-cyclohexene conversion is 45%, oxygen conversion 98% and vinyl-1-cyclohexene oxide yield 30 mole percent.

The following example illustrates an embodiment of the invention wherein a relatively small quantity of polyacyl ester solvent is employed as solvent in the production of an olefin oxide and as co-products significant quantities of other components useful in commerce which components are derived from propylene oxide. The observed yield of propylene oxide, per se, is relatively low in this example because of in situ transformation to these co-products. This example further illustrates the deleterious effect on olefin oxide yield of substantial quantities of monoacyl esters of polyhydroxy compounds as described supra.

Example XXII

In a continuous operation employing a 300-ml. stainless steel autoclave, 344 g./hr. of propylene glycol diacetate, 463 g./hr. of high-boiler product of a previous propylene oxidation run (boiling point higher than that of propylene glycol diacetate), 0.8 g./hr. of acetaldehyde, 362 g./hr. of propylene and 136 g./hr. of oxygen comprised the feed to the reactor. Reactor temperature was 200° C. and the pressure was 50 atmospheres. At steady state, reactor residence time was about 4 minutes and the propylene glycol diacetate content of the liquid phase was 26.4 weight percent. The propylene conversion was 20.9% and the oxygen conversion was 98.3%. Among the products formed, propylene oxide was obtained in 13.2 mole percent yield, propylene glycol was obtained in 9.3 mole percent yield, and the combined yields of propylene glycol mono-formate and propylene glycol monoacetate (via reaction of formed propylene oxide with formed formic and acetic acids) was 10.8 mole percent; thus, the combined yield, based on propylene, of propylene oxide and the simple derivatives thereof, such as propylene glycol and propylene glycol mono-esters, was 33.3 mole percent.

The following example illustrates an attempt to prepare an olefin oxide in a liquid reaction medium similar to that in the preceding example, except in this example, the polyacyl ester solvent, propylene glycol diacetate, was omitted from the reaction.

Example XXIII

Into a 150-ml. Hoke reaction vessel, described in previous examples, was placed 25.44 g. of the high-boiler material described and used in Example XXII. To this material was added 0.12 g. of acetaldehyde and 6.34 g. of propylene. No polyacyl ester was added to the reaction vessel. The reaction vessel was affixed to the agitator yoke of the vibrator apparatus and immersed in a hot polyethylene glycol bath until complete equilibration at 200° C. was reached. The autogenous pressure of the reactor at equilibrium was 160 p.s.i.g., whereupon oxygen was added to a total pressure of 360 p.s.i.g., then subsequently oxygen pressure was raised to 510 p.s.i.g. after 5 minutes had elapsed. The oxidation appeared to be slow, judging by the low exotherm produced, and was allowed to proceed for 10 minutes. At this time the oxygen was turned off and the vessel was immersed in the cold water bath. The contents of the reaction vessel were analyzed by vapor phase chromatography and found to contain no propylene oxide whatsoever, i.e., 0% yield of propylene oxide. Only small quantities of other products, normal co-products of propylene oxidations, were found in this oxidation mixture. Thus, in using this high-boiling polymeric product of propylene oxidation as the solvent for propylene oxidation no propylene oxide was produced and a strong overall inhibition of the oxidation was observed.

The following example illustrates that embodiment of the invention wherein an olefin oxide is prepared by oxidizing an olefin in a liquid reaction medium comprised of a polyacyl ester solvent in combination with a hydrocarbon diluent.

Example XXIV

In a continuous operation similar to that described above, propylene glycol diacetate solvent and benzene as diluent (1:1 mixture by weight), propylene and oxygen are fed to the reactor. The reactor is heated to 200° C. and pressured to 50 atmospheres. At steady state, reactor residence time of about 4 minutes, propylene conversion is 35%, oxygen conversion is 99% and propylene oxide is obtained in 40 mole percent yield.

In like manner, any of the above-mentioned diluents may be combined with the polyacyl ester solvents of this invention to provide a liquid phase oxidation medium consisting of no less than 25% by weight based on said medium of said polyacyl ester solvent.

Although the foregoing description and specific examples are directed to the preparation of epoxides of olefins by the oxidation of olefins with molecular oxygen in a liquid reaction medium comprising fully esterified polyacyl esters of polyhydroxyalkanes, polyhydroxycycloalkanes and polyalkylene glycols, it is within the purview of this invention to utilize this versatile reaction medium to prepare epoxides of other compounds in similar oxidations of other compounds containing olefinically unsaturated linkages such as hydrocarbons, halohydrocarbons, alcohols, ethers, ketones, acids, esters, amides, imides, nitriles and phosphorus esters. Typical ethylenically unsaturated compounds which are contemplated include allyl diphenyl phosphate, dicrotyl phenyl phosphate, allyl chloride, crytyl chloride, mono-and dichlorobutenes, methallyl chloride, o-, n-, and p-chlorostyrene, 3-pentenol-1, 9-octadecenol-1, 2-ethylhexenol-2, cyclopentenol, 3-cyclohexenylmethanol, diallyl ether, butyl crotyl ether, 4-pentenyl butyl ether, butyl 3-dodecenyl ether, 1,4-pentadienyl butyl ether, 3-pentenonitrile, 4-cyanocyclohexene, N-crotylphthalimide, N-allylphthalimide, cinnamic acid, vinylacetic acid, allyl acetate, crotyl acrylate, methyl allyl ketone, methyl 2-pentenyl ketone, ethylene glycol methacrylate, propylene glycol diacrylate and the like. Other suitable ethylenically unsaturated compounds are described in U.S. Patent 2,977,374.

Polyepoxides of compounds of the above-recited classes of compounds having a plurality of double bonds are also prepared according to the process of the present invention. For example, polymers of diolefins having 4–6 carbon atoms, when used as starting materials yield polydiene-epoxides suitable for use in textile finishing.

Variations and modifications of the instant invention will occur to those skilled in the art without departing from the spirit and scope thereof.

This application is a continuation-in-part of copending U.S. application Serial No. 175,315, filed February 23, 1962, now abandoned.

What is claimed is:

1. Process for the preparation of olefin oxides which comprises oxidizing an olefin having up to 18 carbon atoms and selected from the group consisting of aliphatic ethylenic hydrocarbons, cycloethylenic hydrocarbons and aryl-substituted aliphatic ethylenic and cycloethylenic hydrocarbons with molecular oxygen in a liquid reaction medium consisting essentially of at least 25% by weight of a polyacyl ester solvent, said solvent being selected from the group consisting of unsubstituted fully esterified polyacyl esters of polyhydroxyalkanes, polyhydroxycycloalkanes, polyglycols, and mixtures thereof, said polyacyl esters having from 1 to 18 carbon atoms in each acyl moiety and from 2 to 18 carbon atoms in each alkylene and cycloalkylene moiety.

2. Process for the preparation of olefin oxides which comprises oxidizing an olefin selected from the group consisting of aliphatic ethylenic hydrocarbons, cycloethylenic hydrocarbons and aryl-substituted aliphatic ethylenic and cycloethylenic hydrocarbons with molecular oxygen in the absence of added catalysts in a liquid reaction medium consisting essentially of at least 25% by weight of a polyacyl ester solvent, said solvent being selected from the group consisting of unsubstituted fully esterified polyacyl esters of polyhydroxyalkanes, polyhydroxycycloalkanes, polyglycols, and mixtures thereof, said polyacyl esters having from 1 to 18 carbon atoms in each acyl moiety and from 2 to 18 carbon atoms in each alkylene and cycloalkylene moiety, and recovering the formed olefin oxide.

3. Process for the preparation of olefin oxides which comprises oxidizing an olefin having from 2 to 8 carbon atoms and selected from the group consisting of aliphatic ethylenic hydrocarbons, cycloethylenic hydrocarbons and aryl-substituted aliphatic ethylenic and cycloethylenic hydrocarbons, with molecular oxygen in a liquid reaction medium consisting essentially of at least 25% by weight of a polyacyl ester solvent, said solvent being selected from the group consisting of unsubstituted fully esterified polyacyl esters of polyhydroxyalkanes, polyhydroxycycloalkanes, polyglycols, and mixtures thereof, said polyacyl esters having from 1 to 6 carbon atoms inclusive in each acyl moiety and from 2 to 6 carbon atoms inclusive in each alkylene moiety of the polyhydroxyalkane and the polyglycol and in the cycloalkylene moiety of the polyhydroxycycloalkane.

4. Process according to claim 3 wherein said ester is a polyacyl ester of a polyhydroxyalkane.

5. Process according to claim 4 wherein said polyacyl ester is a vicinal diacyl ester of a dihydroxyalkane.

6. Process according to claim 5 wherein said diacyl ester is propylene glycol diacetate.

7. Process according to claim 3 wherein said ester is a polyacyl ester of a polyhydroxycycloalkane.

8. Process according to claim 3 wherein said ester is a polyacyl ester of a polyglycol.

9. Process for the preparation of propylene oxide which compromises oxidizing propylene with molecular oxygen in a liquid reaction medium consisting essentially of at least 25% by weight of propylene glycol diacetate.

10. Process for the preparation of propylene oxide which comprises oxidizing propylene with molecular oxygen in the absence of added catalysts in a liquid reaction medium consisting essentially of at least 25% by weight of propylene glycol diacetate, and recovering the formed propylene oxide.

11. Process for the preparation of styrene oxide which comprises oxidizing styrene with molecular oxygen in a liquid reaction medium consisting essentially of at least 25% by weight of propylene glycol diacetate.

12. Process for the preparation of butadiene oxide which comprises oxidizing butadiene with molecular oxygen in a liquid reaction medium consisting essentially of at least 25% by weight of propylene glycol diacetate.

References Cited in the file of this patent

UNITED STATES PATENTS

| | | |
|---|---|---|
| 2,475,605 | Prutton et al. | July 12, 1949 |
| 2,784,202 | Gardner et al. | Mar. 5, 1957 |
| 3,071,601 | Aries | Jan. 1, 1963 |

UNITED STATES PATENT OFFICE
CERTIFICATE OF CORRECTION

Patent No. 3,153,058                October 13, 1964

Dexter B. Sharp et al.

It is hereby certified that error appears in the above numbered patent requiring correction and that the said Letters Patent should read as corrected below.

Column 1, line 47, for "system" read -- systems --; column 4, line 20, for "craracteristic" read -- characteristic --; column 5, lines 65 and 66, for "1-(1-biphenyl)-" read -- 1-(1-biphenylyl)- --; column 6, line 1, for "butadiene-acrylonitrile" read -- butadiene/acrylonitrile --; column 8, line 14, after "oxidation" insert -- of olefin-containing feedstocks in a liquid reaction --; column 10, line 43, for "imersed" read -- immersed --; column 11, line 22, for "or" read -- of --; column 16, line 23, for "compromises" read -- comprises --.

Signed and sealed this 30th day of March 1965.

(SEAL)
Attest:

ERNEST W. SWIDER              EDWARD J. BRENNER
Attesting Officer              Commissioner of Patents